US006384411B1

(12) United States Patent
Hirabayashi et al.

(10) Patent No.: US 6,384,411 B1
(45) Date of Patent: May 7, 2002

(54) ION SOURCE AND MASS SPECTROMETER INSTRUMENT USING THE SAME

(75) Inventors: Atsumu Hirabayashi, Kokubunji; Minoru Sakairi, Kawagoe; Yasuaki Takada, Kokubunji; Hideaki Koizumi, Tokyo; Kaoru Umemura, Musashino, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/627,334

(22) Filed: Jul. 27, 2000

Related U.S. Application Data

(63) Continuation of application No. 09/328,664, filed on Jun. 9, 1999, now Pat. No. 6,147,347, which is a continuation-in-part of application No. 08/783,089, filed on Jan. 14, 1997, now abandoned, which is a continuation-in-part of application No. 08/404,615, filed on Mar. 15, 1995, now abandoned.

(30) Foreign Application Priority Data

Mar. 15, 1994 (JP) ........................................ 6-043523
Aug. 26, 1994 (JP) ........................................ 6-201767

(51) Int. Cl.$^{7}$ ........................ B01D 59/44; H01J 49/00; G01N 27/26; G01N 27/447

(52) U.S. Cl. ........................ 250/288; 204/452; 204/603

(58) Field of Search ................................ 250/288, 425; 204/452, 603

(56) References Cited

U.S. PATENT DOCUMENTS

| | | | | |
|---|---|---|---|---|
| 4,298,795 A | * 11/1981 | Takeuchi et al. | 250/288 X |
| 4,300,044 A | 11/1981 | Iribarne et al. | 250/282 |
| 4,861,988 A | 8/1989 | Henion et al. | 250/288 |
| 4,935,624 A | 6/1990 | Henion et al. | 250/288 |
| 4,977,785 A | 12/1990 | Willoughby et al. | 73/863.12 |
| 5,122,670 A | 6/1992 | Mylchreest et al. | 250/423 R |
| 5,130,538 A | 7/1992 | Fenn et al. | 250/282 |
| 5,170,052 A | 12/1992 | Kato | 250/288 |
| 5,170,053 A | 12/1992 | Hail et al. | 250/288 |
| 5,223,226 A | 6/1993 | Wittmer et al. | 422/100 |
| 5,306,412 A | 4/1994 | Whitehouse et al. | 204/452 |
| 5,306,910 A | 4/1994 | Jarrell et al. | 250/288 |
| 5,349,186 A | 9/1994 | Ikonomou et al. | 250/288 |
| 5,376,789 A | 12/1994 | Stenhagen | 250/288 |
| 5,423,964 A | 6/1995 | Smith et al. | 204/452 |
| 5,559,326 A | 9/1996 | Goodley et al. | 250/288 |
| 5,898,175 A | 4/1999 | Hirabayashi et al. | 250/288 |
| 6,114,693 A | 9/2000 | Hirabayashi et al. | |

OTHER PUBLICATIONS

B. Thomson et al., "Field induced ion evaporation from liquid surfaces at atmospheric pressure", *Journal of Chemical Physics*, vol. 71, No. 11, Dec. 1, 1979, pp. 4451–4463.

H. Kambara, "Sample Introduction System for Atmospheric Pressure Ionization Mass Spectrometry of Nonvolatile Compounds", *Analytical Chemistry*, vol. 54, No. 1, Jan. 1982, pp. 143–146.

(List continued on next page.)

*Primary Examiner*—Jill Warden
*Assistant Examiner*—John S. Starsiak, Jr.
(74) *Attorney, Agent, or Firm*—Antonelli, Terry, Stout & Kraus, LLP

(57) ABSTRACT

An ion source includes a gas supplier which supplies a gas through a gas inlet into a gas passage defined in a body to form a gas flow through the gas passage along a capillary inserted into the body and through an orifice defined in the body past a tip of the capillary so that the gas flow sprays a sample solution from the tip of the capillary. The gas supplier regulates a pressure of the gas in the gas passage to adjust a characteristic value F/S to a predetermined value, where F is a flow rate of the gas flow at standard conditions (20° C., 1 atmosphere), and S is a difference between a cross section of the orifice and a cross section of a tip portion of the capillary in the orifice.

4 Claims, 10 Drawing Sheets

OTHER PUBLICATIONS

M. Yamashita et al., "Electrospray Ion Source. Another Variation on the Free–Jet Theme", *Journal of Physical Chemistry*, vol. 88, No. 20, 1984, pp. 4451–4459.

A. Bruins et al., "Ion Spray Interface for Combined Liquid Chromatography/Atmospheric Pressure Ionization Mass Spectometry", *Analytical Chemistry*, vol. 59, No. 22, Nov. 15, 1987, pp. 2642–2646.

M. Ikonomou et al., "Electrospray—Ion Spray: A Comparison of Mechanisms and Performance", *Analytical Chemistry*, vol. 63, No. 18, Sep. 15, 1991, pp. 1989–1998.

A. Cappiello et al., "Micro Flow Rate Particle Beam Interface for Capillary Liquid Chromatography/Mass Spectrometry", *Analytical Chemistry*, vol. 65, No. 9, May 1, 1993, pp. 1281–1287.

P. Kebarle et al., "From Ions in Solution to Ions in the Gas Phase—The Mechanism of Electrospray Mass Spectrometry", *Analytical Chemistry*, vol. 65, No. 22, Nov. 15, 1993, pp. 972 A–974 A.

A. Bruins, "Atmospheric–pressure–ionization mass spectrometry—II. Applications in pharmacy, biochemistry and general chemistry", *Trends in Analytical Chemistry*, vol. 13, No. 2, 1994, pp. 81–90.

M. Wilm et al., "Electrospray and Taylor–Cone theory, Dole's beam of macromolecules at last?", *International Journal of Mass Spectrometry and Ion Processes*, vol. 136, Nos. 2/3, Sep. 22, 1994, pp. 167–180.

A. Hirabayashi et al., "Sonic Spray Ionization Method for Atmospheric Pressure Ionization Mass Spectrometry", *Analytical Chemistry*, vol. 66, No. 24, Dec. 15, 1994, pp. 4557–4559.

U.S. Patent Application Ser. No. 09/299,638 filed on Apr. 27, 1999, effective U.S. filing date Sep. 5, 1996.

* cited by examiner

ION SOURCE AND MASS SPECTROMETER INSTRUMENT USING THE SAME

CROSS-REFERENCES TO RELATED APPLICATIONS

This application is a continuation of application Ser. No. 09/328,664 filed on Jun. 9, 1999, now U.S. Pat. No. 6,147,347, which is a continuation of application Ser. No. 08/783,089 filed on Jan. 14, 1997, now abandoned, which is a continuation of application Ser. No. 08/404,615 filed on Mar. 15, 1995, now abandoned.

BACKGROUND OF THE INVENTION

The present invention relates to an ion source suited for ionizing a sample existing in a liquid to introduce the ionized sample into a mass spectrometer, and a mass spectrometer using the ion source.

Using capillary electrophoresis (CE) or the liquid chromatograph (LC) it is easy to separate a sample existing in a solution but difficult to identify the kinds of samples separated. On the other hand, a mass spectrometer (MS) can identify the separated sample with high accuracy. Thus, when it is intended to separate and analyze a plurality of biological substances dissolved in a solvent such as water, there is generally used capillary electrophoresis in combination with a mass spectrometer (CE/MS) or liquid chromatograph in combination with a mass spectrometer (LC/MS) which is constructed by combining the capillary electrophoresis or the liquid chromatograph with the mass spectrometer.

In order to analyze the sample, which is separated by the capillary electrophoresis or the liquid chromatograph, using the mass spectrometer, it is necessary to transform the sample molecules in the solution into gaseous ions, i.e. particles or gaseous materials. A conventional technique for producing such ions is known as the ion spray method (as is disclosed on pp 2642 to 2646, Analytical Chemistry, Vol. 59 (1987)). In the ion spray method, the gas is introduced along the outer circumference of a capillary, and a high voltage (e.g., 3 to 6 kV) is applied between the capillary to be fed with the sample solution and an aperture (e.g., the sampling orifice) for introducing the ions into the mass spectrometer, so that an intense electric field is established at the capillary tip. By the electrospray phenomenon established by that construction, there are produced fine charged droplets, which are evaporated by the aforementioned gas to form gaseous ions, i.e. gaseous particle or gaseous materials. The ions thus formed are introduced via the sampling orifice into the mass spectrometer so that they are mass-analyzed. The aforementioned gas promotes the atomization of the charged droplets and suppresses the discharge at the tip of the capillary.

Another conventional technique is known as the electrospray method of ionizing a solution with no gas flow at a flow rate of 10 $\mu$L (i.e., microliters)/min. to the capillary (as disclosed on pp. 4451 to 4459, Journal of Physical Chemistry, Vol. 88 [1984]). The electrospray method is different from the ion-spray method but has the same ionization principle as that of the ion-spray method.

A further conventional technique is known as the atmospheric pressure chemical ionization method (as disclosed on pp. 143 to 146, Analytical Chemistry, Vol. 54 [1982]). In the atmosphere pressure chemical ionization method there is disposed in the vicinity of the tip of the heated capillary an electrode for generating a corona discharge to ionize the volatile molecules sprayed under atmospheric pressure.

The various conventional spray ionization methods described above in order to achieve a high ionization efficiency, it is necessary to form fine charged droplets having a diameter no more than about 10 nm.

In the conventional techniques described above, a high voltage is applied around the sampling orifice. This application makes it necessary to avoid an electric shock, thus causing a problem that the instrument has a complicated structure. Since the high voltage is applied to the capillary tip in the CE/MS, a higher voltage has to be applied so that the electrophoresis of the sample may be effected in the capillary electrophoresis instrument.

Moreover, the electrospray phenomenon is so seriously influenced by contamination at the tip of the capillary and on the surface of the sampling orifice that once the spray of the sample solution is interrupted the electrospray method or the ion spray method detects different ion intensities with a poor reproducibility even if the spray is reopened under the identical conditions. In order to maximize the ion intensity detected, therefore, the troublesome operations of finely adjusting the capillary position or cleaning the capillary tip and the sampling orifice surface are required each time the spraying operation is reopened. As a result, the structure of the instrument is so complicated for avoiding electric shock that the operations are obstructed.

In the conventional techniques described above, moreover, the sample solution has to be mixed with volatile molecules such as alcohol or ammonia as the solvent. It has been empirically known that no electrospray phenomenon occurs when the solvent used has a low electric conductivity, and that the electric conductivity of the sample solution has to be within $10^{-13}$ to $10^{-15}$ $\Omega cm^{-1}$ so as to establish the electrospray phenomenon. Thus, there arises a problem that so long as those conditions are not satisfied, the electrospray phenomenon does not stably occur to limit the selection of the solvent.

Further, since a high voltage is applied between the capillary and the sampling orifice, a discharge may occur around the ion source to make it difficult to use an inflammable solvent. If the kind of solvent to be used is thus limited, the substance to be measured may be unable to be separated by the capillary electrophoresis or the liquid chromatograph.

SUMMARY OF THE INVENTION

The object of the present invention is to provide an ion source that can be safely and easily operated and a mass spectrometer instrument which is capable of producing ions stably and analyzing a sample with high sensitivity and with an excellent reproducibility by using the ion source.

Another object of the present invention is to provide an ion source, which can use a wide range of solvents in the capillary electrophoresis or liquid chromatograph, and a mass spectrometer instrument using the ion source.

The present invention includes an ion source having an ion source body for forming a gas flow around the outer circumference of the tip of a capillary to be fed with a sample solution, so that the gas is sprayed around the outer circumference of the tip into the air to ionize the sample solution. In the present invention the Mach number is determined by the flow velocity of the gas and its sonic velocity to be at least within a range around 1. Moreover, the ion source body is constructed to have a gas inlet port for introducing the gas and an orifice for spraying the gas, into which is inserted the tip of the capillary so that the gas is sprayed from a small volume formed between the outer circumference and the inner circumference of the orifice. The present invention may alternatively include a mass spectrometer instrument using the aforementioned ion source.

The characteristics of the ion source of the present invention will be described in more detail in the following. The ion source includes a capillary for feeding a sample solution into the air, and an ion source body having an orifice for receiving the tip of the capillary and forming a gas flow along the outer circumference of the capillary to the tip of the capillary. A characteristic value F/S dictating that the gas flow is within a predetermined range is determined by a flow rate F of the gas reduced into the standard state (i.e. standard conditions) (20° C., 1 atm) and the cross section of a cross section normal to the center axis of the orifice, whereby the sample solution fed into the air is ionized in the vicinity of the tip of the capillary by the gas flow. The desired predetermined range of the aforementioned characteristic value F/S is 200 m/s to 1000 m/s. In order to ionize the sample efficiently, the aforementioned characteristic value F/S is preferably set to 350 m/s to 700 m/s and more preferably set to 500 m/s to 600 m/s. Here, the value F/S has the same dimensions as those of a velocity but is different from the actual velocity of the sprayed gas. The flow rate F is a value which is reduced from the flow rate of the sprayed gas in the standard state. The actual sprayed gas has a higher pressure than 1 atm. Incidentally, the flow rate of the sample solution is set to 1 $\mu$L (i.e., microliters)/min. to 200 $\mu$L (i.e., microliters)/min.

By the gas sprayed from the small volume at the tip of the capillary, fine charged droplets of the sample solution are formed at the capillary tip. When the Mach number of the gas flow approaches 1, finer charged droplets are formed. By the sprayed gas, the solvent is gasified from the formed charged droplets to produce gaseous ions, i.e. gaseous particles or gaseous materials. The ions thus produced can be introduced into and analyzed by the mass spectrometer.

When the characteristic value F/S of the sprayed gas flow at the capillary tip exceeds a certain value, the sample solution introduced into the capillary is broken into charged droplets of various sizes at the capillary tip. The extremely fine charged droplets of less than at least 100 nm are easily desolved (or dried). Even the neutral sample molecules may be bonded to protons or sodium ions in the extremely fine droplets to produce quasi-molecular ions so that the ions can be analyzed by the mass spectrometer instrument.

The conditions for determining the size of the droplets to be formed at the capillary tip are essentially the characteristic value F/S or the Mach number of the sprayed gas flow. In the production efficiency of the extremely fine droplets, there are other factors to be considered. In other words, the pressure difference between the solution surface and the volume surrounding the capillary tip has to be larger than a certain value. By reducing the capillary wall thickness to 100$\mu$ or less, the production efficiency for the extremely fine droplets can be enhanced.

Moreover, the reproducibility of the ionization conditions can also be enhanced by aligning the center axis of the capillary with the center axis of the orifice of the ion source body to make the gas velocity uniform at the tip of the capillary so that the sprayed gas containing the droplets of the sample solution may be axially symmetric.

If the characteristic value F/S of the gas flow is constant, the droplets of the sample solution have substantially the same distribution of their size and have no substantial relation to the gas flow rate F and the cross section S of the small volume for spraying the gas. Empirically, it is sufficient that the gas flow rate F be 0.5 liters/min. or more. The material of the capillary and the potential to be applied to the capillary have no substantial influence upon the size of the droplets to be produced from the solution.

According to the present invention, the ions can be efficiently produced from the sample solution by the sprayed gas while grounding the potentials of the individual portions such as the capillary constituting the ion source to the earth. As a result, the ion source can have its structure made simpler and its operability and safety enhanced better than those of the conventional ionization method. Moreover, when the ion source of the present invention is applied to the capillary electrophoresis instrument to constitute the CE/MS, the tip of capillary can be grounded to earth, as described above, and the capillary electrophoresis can independently apply a potential thereto thus greatly simplifying its entire construction and its operation and drastically improving its operational safety.

In the conventional ionization method, such as electrospray and ion spray methods, the ionization is highly influenced by contamination around the capillary and the sampling orifice. In the sonic spray method of the present invention for producing the ions from the sample solution by the sprayed gas, on the contrary, the ionization is not influenced by contamination around the capillary and the sampling orifice.

In the conventional ionization the ion intensity to be detected is highly influenced by contamination around the sampling orifice and at the capillary. In the sonic spray method of the present invention, on the contrary, the ion intensity to be detected is influenced neither by contamination around the capillary nor by contamination around the sampling orifice so that the sample can be detected with high sensitivity and with an excellent reproducibility. In short, the capillary tip and the ion source body are arranged in optimum positions so that the ions can be produced and detected from the sample solution with an excellent reproducibility and in a high efficiency.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

The present invention will be described in detail in the following with reference to the accompanying drawings.

Figure 1:
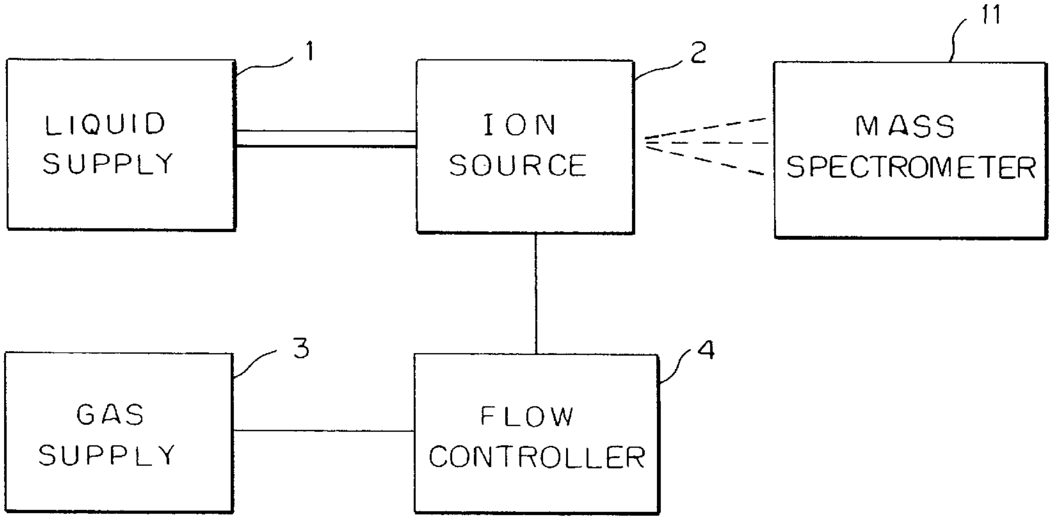
FIG. 1 is a block diagram showing a construction of an instrument according to the present invention.

FIG. 1 is a block diagram showing a construction of an instrument according to the present invention. A sample solution is fed to a liquid supply 1 and is introduced into an unillustrated capillary which is disposed in an ion source 2. A gas fed from a gas supply 3 is adjusted in its flow rate by a flow controller 4 and is introduced into the ion source 2. The gas thus introduced flows along the outer circumference of the capillary until it is sprayed as a gas flow having a characteristic value F/S of higher than about 200 m/s from the tip of the capillary into the atmosphere. The sample solution introduced into the capillary is formed, by the gas sprayed from the tip of the capillary, into not only fine droplets but also gaseous quasi-molecular ions of the sample molecules, i.e. gaseous particles or gaseous materials (this ionization method will be called hereinafter the new ion spray method, i.e., the sonic spray method). The ions thus produced are carried by the aforementioned gas from the tip of the capillary into and analyzed by a mass spectrometer 11. Here will be described the features of the ion source according to the present invention in connection with its construction and embodiments of mass spectrometry using the ion source.

In the first embodiment of the present invention, the ion source is coupled to a liquid chromatograph which constitutes the liquid chromatograph/mass spectrometer (LC/MS). The sample solution separated by the liquid chromatograph is fed through the (not-shown) connection tube to the liquid supply 1, as shown in FIG. 1. Alternatively, the liquid chromatograph has its column connected directly to the liquid supply 1.

Figure 2:
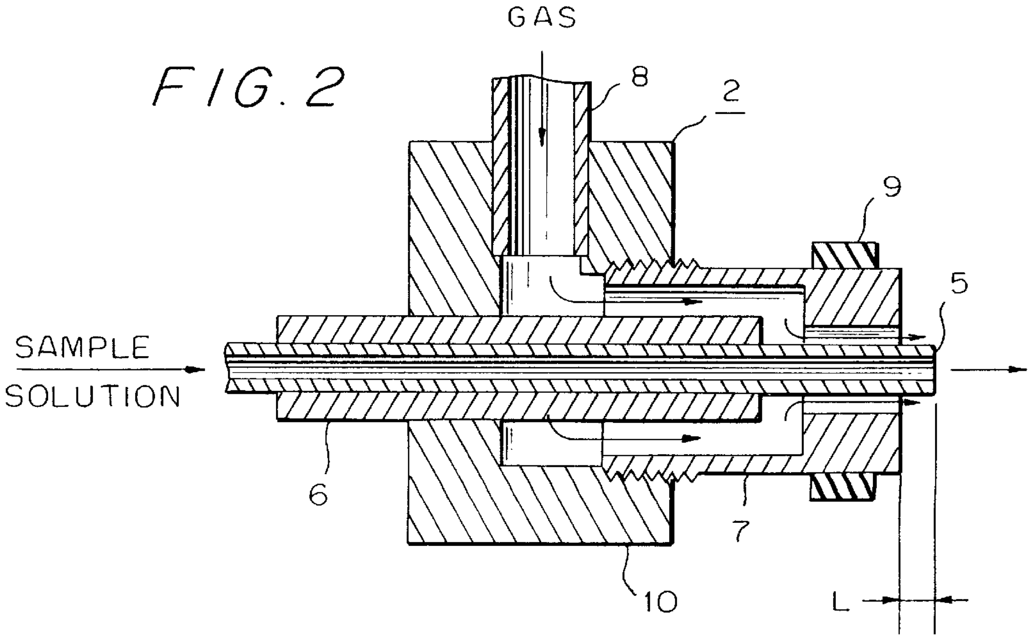
FIG. 2 is a section showing a first embodiment of an ion source of the present invention.

FIG. 2 is a section showing the ion source to be used in the first embodiment. The sample solution is introduced at a flow rate of 100 $\mu$L (i.e., microliters)/min. into a capillary 5 (made of stainless steel to have an internal diameter of 100 $\mu$m and an external diameter of 300 $\mu$m) from the liquid supply 1 arranged at the left-hand side of FIG. 2. The capillary 5 is held and fixed in a metal capillary (made of stainless steel) 6 because it is weak and liable to warp if it is made thin. The capillary 5 has its tip of about 4 mm exposed from the metal capillary 6. The ion source body for spraying the gas, which has been fed along the outer circumference of the capillary 5, from the tip of the capillary 5 at a predetermined flow velocity into the atmosphere, is constructed of an orifice 7 and a orifice holder 10.

The capillary 5 is fixed through the metal capillary 6 in the orifice holder 10 such that its tip is aligned with the opening (having the minimum internal diameter of 400 $\mu$m of the orifice 7) which is formed in the orifice 7 for forming a gas spraying nozzle. The orifice 7 itself is fixed directly in the orifice holder 10. The ion source body is surrounded by the atmosphere. The capillary 5 has its tip exposed to the atmosphere at the side of the aforementioned opening by a size L, as shown in FIG. 2.

A nitrogen gas or air is introduced from a gas cylinder or compressor into the ion source body via the flow controller 4 (of FIG. 1) and a gas-in tube 8 so that it is sprayed at the tip of the orifice from the small volume which is formed between the inner circumference of the aforementioned opening and the outer circumference of the capillary 5. The gas flow velocity in the aforementioned small volume can be estimated from the characteristic value F/S which is determined by the cross section S of the small volume, as taken in a plane normal to the center axis of the capillary 5 or the opening, and the flow rate F of the gas flowing in the orifice. The cross section S can be obtained from Equation (1) in case the aforementioned opening has a circular shape (having an internal diameter D) and in case the capillary 5 circular section (having an external diameter d), as taken in a plane normal to its longitudinal direction:

$$S=\pi(D^2-d^2)/4 \quad (1).$$

The flow rate F of the gas can be determined by using a flow meter such as a mass flow meter or purge meter. As a result, the gas flow velocity at the exit of the small volume can be estimated from the characteristic value F/S by Equation (2). The gas flow rate is usually expressed by the value which is calibrated in the standard state (i.e., at 20° C. and at 1 atm).

$$v=4F/\{\pi(D^2-d^2)\} \quad (2).$$

The gas adiabatically expands at the gas exit of the orifice 7 to cool the orifice 7 and the capillary 5. In order to maintain the sprayed gas to the room temperature or higher thereby to promote the atomization of the produced droplets, therefore, the orifice 7 is desirably equipped with a heater 9 to heat the introduced gas to a temperature between 50° C. to about 90° C.

In case the length (i.e., the exposed length L) of the tip of the capillary 5 from the orifice 7 is 2 mm or more, the pressure gradient of the gas at the tip of the capillary 5 drops to lower the ionization efficiency. In order to adjust the distance between the tip of the capillary 5 and the tip of the orifice 7, therefore, the orifice 7 is fixedly screwed in the orifice holder 10. By adjusting the screwed position of the orifice 7, it is possible to maximize the production efficiency of the ions or the remarkably fine charged droplets.

In the description made above, the nitrogen gas or air is sprayed from the orifice 7, but a rare gas such as argon or carbon dioxide may also be sprayed. From the aspect of cost for purchasing the gas, it is preferable to use nitrogen, air or carbon dioxide. It is more preferable to use dry nitrogen containing little moisture.

In the first embodiment, the axial thickness of the portion having the minimum internal diameter at the tip of the orifice 7 is 2 mm. The term “axial thickness” means a thickness measured along an axis of the opening formed in the orifice 7 in a direction in which the capillary extends into the opening. The smaller thickness makes it easier to align the orifice 7 and the capillary 5, and the thickness as small as about 0.5 mm is preferable for the actual operations.

In the second embodiment, the ion source is connected to a capillary electrophoresis instrument to constitute a capillary electrophoresis/mass spectrometer (CE/MS). The sample solution thus separated by the capillary electrophoresis instrument is fed through an unillustrated connection tube to the liquid supply 1. Alternatively, the capillary or the column of the capillary electrophoresis instrument is connected directly to the liquid supply 1.

Figure 3:
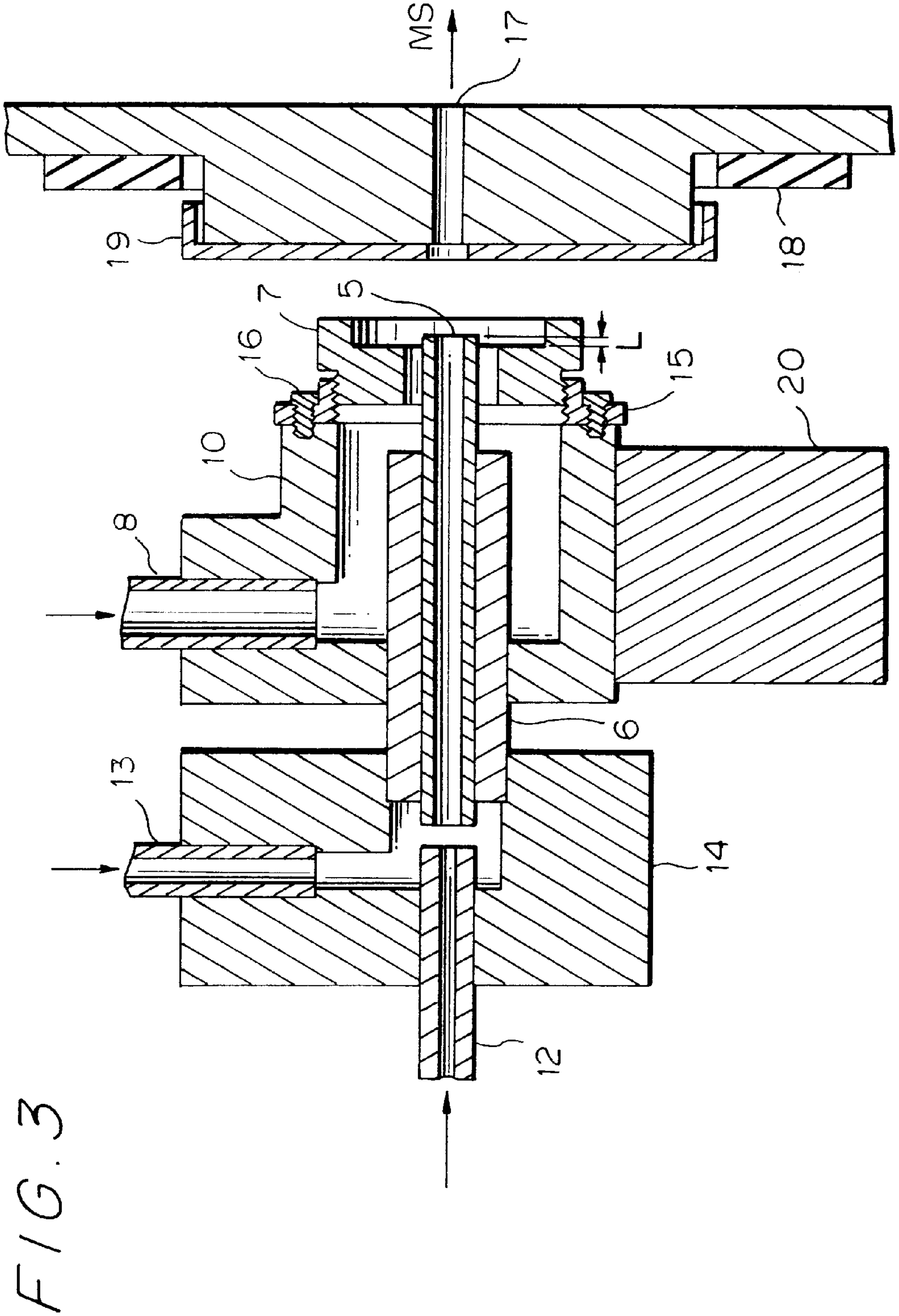
FIG. 3 is a section showing a second embodiment of the ion source of the present invention and a sampling orifice.

FIG. 3 is a section showing the ion source used in the second embodiment. Like the ion source exemplified in the first embodiment, the guide tube shown in FIG. 3 is constructed of the orifice 7 and the orifice holder 10. In the capillary electrophoresis instrument, the flow rate of the sample solution is as small as 0.1 μL (i.e., microliters)/min., and the separated sample solution coming to the trailing end of the electrophoresis capillary is diluted.

As a result, the diluted sample solution can be continuously fed to the capillary 5. When a solvent to dilute the solution is to be added, the ion concentration or pH of the sample solution can be optimized to raise the ionization efficiency of the sample to be measured.

By the capillary electrophoresis instrument, the separated sample solution is introduced from the capillary 12 for electrophoresis into a joint 14 and is mixed with the diluting solvent, which is introduced at a flow rate of 20 μL (i.e., microliters)/min. from a tube 13, so that the mixture is introduced into the capillary 5. Then, the sample is transformed at the tip of the capillary 5, as in the first embodiment, into not only the liquid droplets but also the quasi-molecular ions such as the gaseous sample molecules, i.e., gaseous particles or gaseous materials by the gas which is introduced from the gas-in tube 8.

The capillary 5 is fixed through the metal capillary 6 by the joint 14 and the orifice holder 10. The metal capillary 6 or the joint 14 is used as the electrophoretic electrode of the capillary electrophoresis instrument. A position adjuster 15 for fixing the orifice 7 is fixed on the orifice holder 10 by means of screws 16. The holes formed in the position adjuster 15 for receiving the screws 16 are made to have a larger size than the external size of the screws. As a result, the capillary 5 and the orifice 7 can be aligned by adjusting the position of the orifice 7, which is fixed in the position adjuster 15, in a plane normal to the center axis of the capillary 5. In order to prevent the capillary 5 from being broken during the operation, the orifice 7 is formed on its tip with a circumferential ridge. As in the first embodiment, the orifice 7 may be equipped with a heater for heating the sprayed gas.

A sampling orifice 17 of the mass spectrometer is sized to have an internal diameter of 0.3 mm and a depth of 15 mm, for example. Moreover, the sampling orifice 17 is heated to 100° C. to 150° C. The sampling orifice 17 has its outer side (as located at the atmospheric side) covered with a cover 19 so that it is prevented from being cooled down by the sprayed gas and the droplets of the sample solution. The capillary 5 and the sampling orifice 17 are finely adjusted into alignment by an XYZ stage 20 so that the ions produced at the tip of the capillary 5 are efficiently introduced into the mass spectrometer. Thus, the sample solution can be efficiently analyzed in high accuracy and sensitivity by using the CE-MS of the second embodiment.

Even if the mass spectrometer is exemplified by a quadrupole mass spectrometer so that a voltage at several hundreds V at the maximum is applied to the sampling orifice 17, all the capillary 5 and the metal capillary 6 and their circumferences, i.e., the entire ion source can be grounded to 20 the earth potential. The capillary electrophoresis instrument is given an electrophoretic potential with respect to that earth potential. In case the mass spectrometer used is exemplified by a double-focusing mass spectrometer having an acceleration voltage of about 4 kV for the mass spectrometry of the ion in the magnetic field, a voltage as high as the acceleration voltage is applied to the sampling orifice 17. As a result, a discharge may be established between the tip of the capillary 5 and the sampling orifice 17. However, the discharge can be avoided to ground the circumference of the tip of the capillary 5 to the earth by applying an intermediate voltage (e.g., 1 to 2 kV) between the earth potential and the acceleration potential to the cover 19, by setting the distance between the capillary 5 and the sampling orifice 17 to about 1 cm, and by exemplifying the sprayed gas by a gas having a high electron affinity such as $O_2$ or $SF_6$.

According to the present invention, the total ion amount and the production efficiency for multiply-charged ions can be increased without using the electrospray phenomenon. In order to produce the multiply-charged ion by the electrospray phenomenon, it is necessary to apply a voltage of 2.5 kV or higher to the tip of the capillary. In the present invention, however, the total ion amount and the production efficiency for multiply-charged ions can be increased by using a voltage of 2.5 kV or lower.

In the present instrument, by applying a potential difference of about 200 V to the inside of the tip of the capillary 5, the positive and negative ions are isolated in the portion close to the surface of the sample solution emanating from the tip of the capillary, to establish a state in which either positive or negative ions are more in the portion close to the sample solution surface. According to the sonic spray method of the present invention, therefore, the charge density of the charged droplets produced by the spray of the gas can be raised to increase the total ion amount and the production efficiency for multiply-charged ions without using the electrospray phenomenon.

In the first and second embodiments thus far described, the sample solution separated by the liquid chromatograph, the capillary electrophoresis instrument or another analyzer can naturally have its mass analyzed by feeding it to the liquid supply, as shown in FIG. 1, by a syringe or a syringe pump to ionize it in the ion source 2. Such apparatus would constitute a third embodiment of the present invention.

The features of the ion source according to the present invention will be described on the basis of an example of measurement using the ion source. In the fourth embodiment, all the mass spectropies to be described in the following were made with the instrumental construction and under the conditions, as described in the following, unless otherwise specified.

In the instrumental construction, the ion source shown in FIG. 2 was used, and the cover 19 shown in FIG. 3 was disposed at the capillary side of the sampling orifice. The cover 19 was made of stainless steel to have a thickness of 1 mm with a hole having a diameter of 2 mm, and the sampling orifice had an internal diameter of 0.3 mm. The capillary 5 was made of fused silica (to have an internal diameter of 0.1 mm and an external diameter of 0.2 mm). The orifice had an internal diameter of 400 μm. The capillary 5 had its tip protruded by 0.65 mm from the atmospheric face of the orifice. A double-focusing mass spectrometer (e.g., M-80 of Hitachi) was used as the mass spectrometer. The opening (of 400 μm), the capillary 5 and the sampling orifice were so aligned that the ion intensity detected might be maximized.

As the measuring conditions, the capillary tip, the sampling orifice and the cover 19 were set at the same potential. $N_2$ gas was used as the sprayed gas, and its flow velocity was set to 337 m/s (which is equal to the sonic velocity in the $N_2$ gas at 0° C.). The flow rate of the sample solution (i.e., Gramicidin-S) was set to 40 μL (microliters)/min. The orifice 7 of the ion source body was held at the room temperature, and the ion intensity was measured with the orifice 7 being not heated by the heater 9.

(1) Mass Spectrum (FIG. 4) by Present Ion Source

Figure 4:
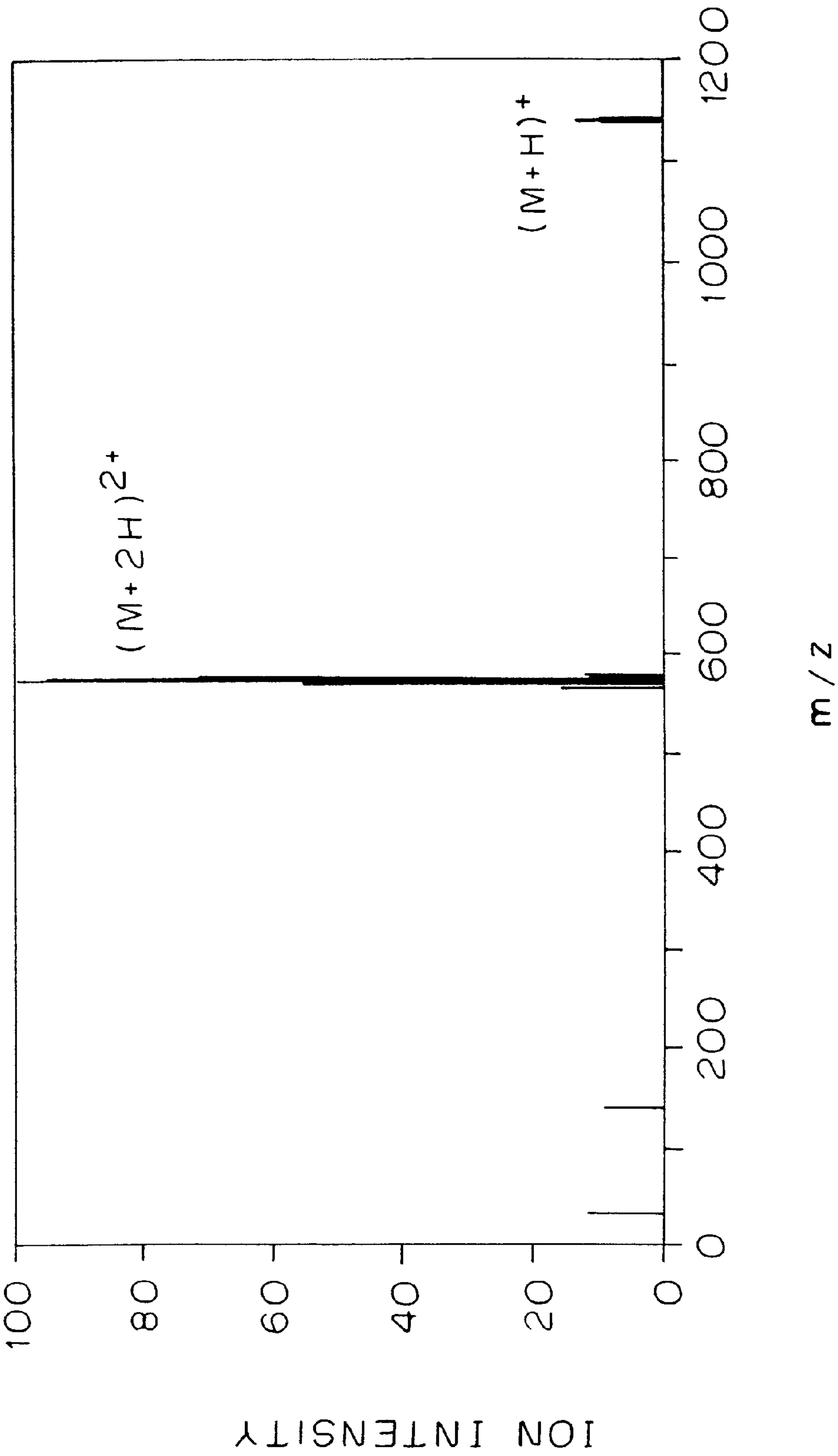
FIG. 4 is a diagram illustrating an example of a mass spectrum obtained by using the ion source of the present invention.

FIG. 4 illustrates the mass spectrum of the case in which the sample solution was exemplified by a solution (having a concentration of 1 μM in a solvent of aqueous solution of 50% of methanol) of Gramicidin, i.e., a kind of peptide. The ion of m/z=140 is thought to be the impurity which came from the sample solution or the air. The positive ion (m/z=33) of $CH_3OH_2$ originating in methanol is slightly observed, but neither the positive ion of $H_3O$ nor its hydrated cluster is observed. Thus, the spectrum obtained is so simple that it can be easily analyzed. According to the method of the prior art such as the electrospray method or the ion spray method, the ions originating in the solvent are intensely observed in the case of mass spectrum using a dilute sample solution.

According to the present invention, the intensity of the positive ion of $CH_3OH_2$ originating in the solvent is substantially unchanged even if the concentration of the sample solution is changed ten times, so that the mass spectrum of the sample can be measured without the influence of the concentration of the sample solution.

Figure 5:
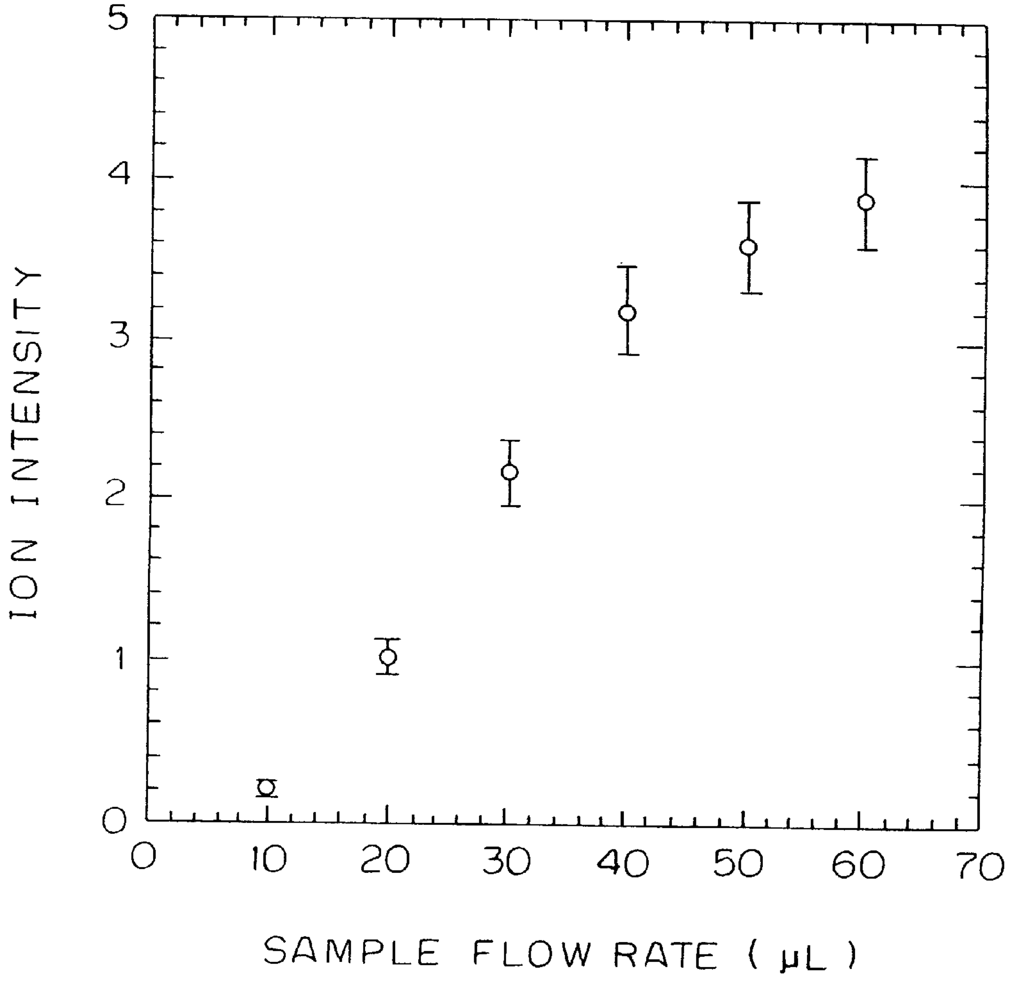
FIG. 5 is a diagram illustrating a relation between a solution flow rate and a detected ion intensity.

(2) Relation (FIG. 5) between Flow Rate of Sample Solution and Ion Intensity FIG. 5 illustrates the intensity of the doubly protonated molecule of Gramicidin-S detected, when the flow rate of the sample solution is changed. For a flow rate of 40 μL (i.e., microliters)/min. or less, the ion intensity linearly increases with the increase in the flow rate. As the flow rate increases, however, the droplets having a larger diameter than that of fine charged droplets (having a diameter of about 10 nm) are preferentially produced to lower the temperature of the sampling orifice. For a flow rate of 40 μL (i.e., microliters)/min. or higher, therefore, the ion intensity less increases with the increase in the flow rate. The sample can be efficiently ionized at the sample solution flow rate within 10 to 60 μL (i.e., microliters)/min.

Incidentally, even in case the sample solution flow rate is zero, a low pressure region having a lower pressure than the atmospheric pressure is formed by the gas sprayed from orifice. As a result, in the sonic spray method, the sample is ionized to establish an ion intensity of not zero (although not illustrated in FIG. 5).

(3) Relation among Size of Gas Spraying Opening at Orifice, Size of Capillary and Ion Intensity With the gas flow velocity being held constant, the ion intensity detected was unchanged even if the internal diameter of that portion of the gas exit at the tip of the orifice 7, which had the least cross section, was changed from 0.4 mm to 0.5 mm. With the gas flow rate being held constant, on the contrary, the ion intensity was far lower in case the opening or the gas exit at the tip of the orifice 7 had the internal diameter of 0.5 mm than in case the opening had the internal diameter of 0.4 mm, so that no ion was substantially detected. It is therefore apparent that the ion formation depends upon not the gas flow but the gas velocity.

With the internal diameter of the aforementioned opening at the tip of the orifice 7 being fixed at 0.5 mm, the ion intensities were compared between the cases of a fused silica capillary (having an internal diameter of 0.1 mm and an external diameter of 0.2 mm) having a wall thickness of 50 μm and a fused silica capillary (having an internal diameter of 0.1 mm and an external diameter of 0.375 mm) having a wall thickness of 137.5 μm, which was nearly three times as large as the former value. Even with the gas velocity being command, the ion intensity detected is higher by about one order of magnitude for the fused silica capillary having the wall thickness of 50 μm. Thus, the ionization efficiency is preferably the higher for the thinner wall capillary. This is because for the thicker wall capillary the gas flowing around the capillary less effectively acts upon the sample solution spurting from the capillary so that the ionization efficiency is accordingly deteriorated.

Although the capillary was exemplified by the fused silica capillary, it may be made of stainless steel. Within a wall thickness range of 10 to 150 μm, the capillary is sufficiently strong and can ionize the sample efficiently.

Figure 6:
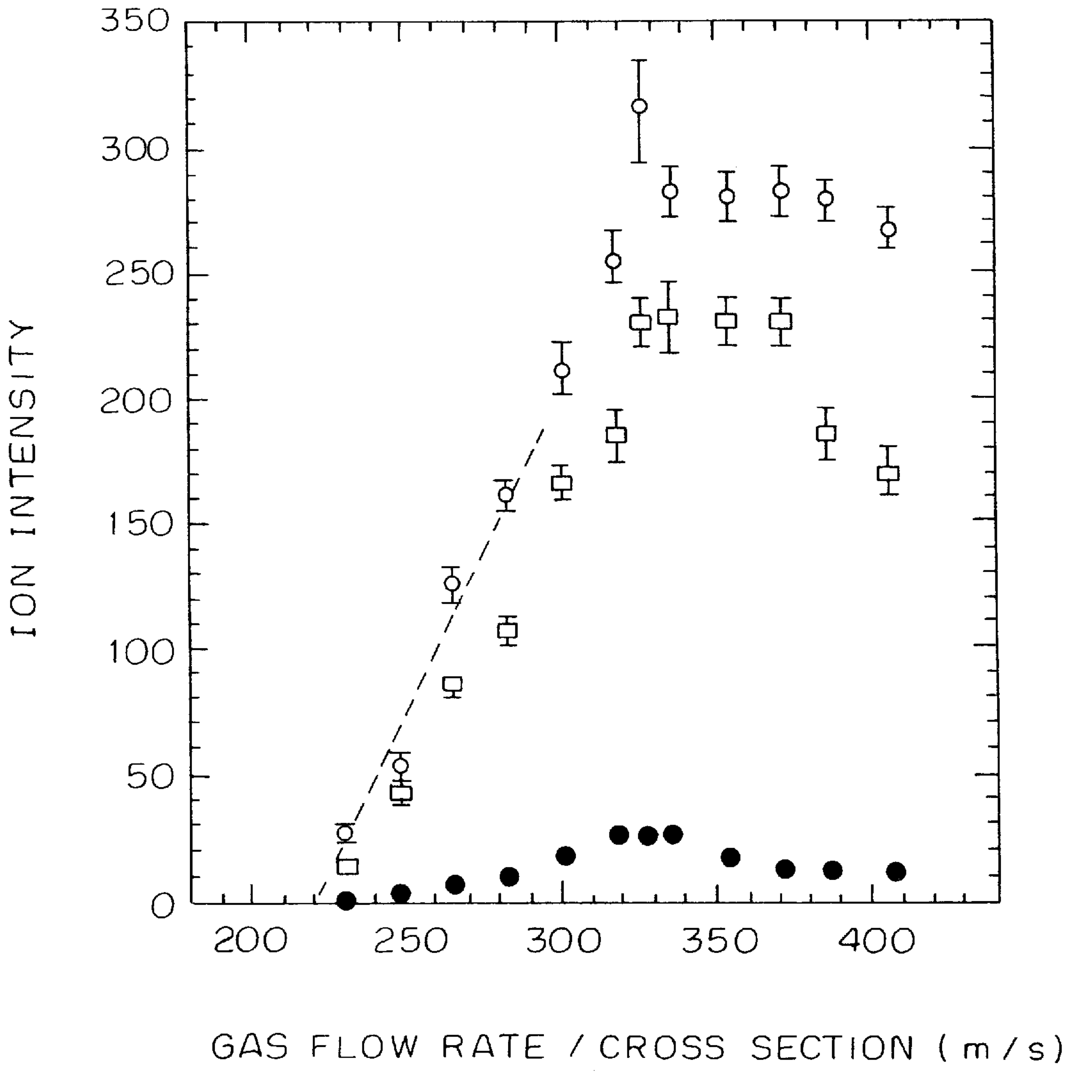
FIGS. 6 and 7 are diagrams illustrating relations between the characteristic value F/S of a sprayed gas and the ion intensity.

(4) Relation (FIG. 6) among Sprayed Gas Velocity, Solvent Concentration and Ion Intensity In FIG. 6, three kinds of sample solutions (having a concentration of 1 μM) were prepared by exemplifying the sample by Gramicidin-S and the solvent by aqueous solutions containing 20%, 50% and 80% of methanol. Next, the three kinds of sample solutions were individually introduced at a flow rate of 40 μL (i.e., microliters)/min. into the capillary 5. The Gramicidin-S was detected in the form of a doubly charged positive ion (m/z=571) having two protons added.

FIG. 6 plots the ion intensity of the ion (m/z=571) of the aforementioned Gramicidin-S against the gas velocity at the capillary tip, which is estimated from the gas flow rate F and the cross section S of the small volume by Equation (2).

Incidentally, the measurements of FIG. 6 were carried out by connecting a pressure regulator to an $N_2$ cylinder having a charge pressure of 150 atm and a charge capacity of 47 L (i.e., liters) to lower the pressure to 7 atms, by introducing the $N_2$ gas into a gas flow meter to regulate and read out the flow rate, and by introducing the $N_2$ gas into the ion source.

In FIG. 6, symbols □, ○ and ● indicate the relative intensities of the ion, which were respectively observed for the sample solution using aqueous solutions of 20%, 50% and 80% of methanol as the solvent. The surface tension of the sample solution at the tip of the capillary 5 dominates the size and ionization efficiency of the charged droplets. The surface tensions of water and methanol are highly different at 0.073 and 0.0225 N/m, respectively, and the three kinds of aqueous solutions of methanol used as the solvent also have different surface tensions.

When the velocity of the sprayed gas is supersonic, shock waves are established in the vicinity of the capillary tip so that the pressure fluctuates in the vicinity of the capillary tip. As a result, the larger droplets are liable to form whereas the finer charged droplets necessary for producing the ion are hard to form, so that the observed ion intensity decreases and becomes unstable. It is therefore thought that the measurement dispersions, as indicated by the lengths of straight segments at the individual points of measurement in FIG. 6, increase when the estimated gas velocity exceeds the sonic velocity in the $N_2$ gas. Since, moreover, the sprayed gas is seriously cooled down in the supersonic region by the adiabatic expansion, the charged droplets are suppressed from the atomization if the heating for preventing the gas guide tube from being cooled down is insufficient.

Under the measuring and instrumenting conditions for the measurement results shown in FIG. 6, the capillary tip and the sampling orifice were set at the same potential, and the gas guide tube and the capillary were not heated but held at the room temperature. Moreover, the ion intensity to be detected in case the sprayed gas has a velocity of about 330 m/s (as estimated) is unchanged even if a voltage as high as 3 kV is applied between the capillary tip and the sampling orifice. As a result, the ion intensity, as illustrated in FIG. 6, depends not upon the heating of the capillary and the ions produced by the voltage applied to the capillary, but the observed ions are produced by the action of the spray gas only. Thus, the sonic spray method of the present invention does not require the actions of the voltage and the heating at the capillary tip. As seen from the result of FIG. 6, moreover, a more sufficient ion intensity than that of the prior art can be achieved, as described in the following, even if the capillary is not heated.

According to the ionization method of the prior art, it has been thought, for forming the charged droplets having a diameter of 10 nm or less, that there is no means but using a strong electric field or a heating. According to the sonic spraying method of the present invention, the formation of charged droplets having a diameter of 10 nm or less is realized merely by spraying the sample solution by using the gas.

On the other hand, the ion intensity, which is detected in the case of the ion spray method of producing the ions by the electrospray phenomenon by setting the gas velocity (estimated by Equation (2)) to such as value of 5 m/s as can neglect the amount of ion produced by the gas injection, and by applying a voltage as high as about 3 kV between the capillary and the sampling orifice, is as low as one tenth or less than the ion intensity, which is detected in the aqueous solution of 50% of methanol and is substantially equal to the ion intensity which is detected in the aqueous solution of 80% of methanol.

By setting the (estimated) velocity of the sprayed gas, it is possible to achieve an ion intensity about three times higher than the ion intensity obtained by the ion spray method of the prior art. The (estimated) velocity of the sprayed gas is preferably set within a range of 275 to 400 m/s, and the ion intensity obtained is about six times as high as or more than the ion intensity by the ion spray method of the prior art. If, moreover, the (estimated) velocity of the sprayed gas is set within a range of 320 to 400 m/s, the ion intensity obtained is about ten times as high as or more than that of the ion spray method of the prior art so that the most preferable result can be achieved.

As illustrated in FIG. 6, the ion intensity obtained in case the solvent is exemplified by an aqueous solution of 20% or 50% of methanol is about ten times as high as or more than the ion intensity obtained in case the aqueous solution of 80% of methanol is used. As a result, the present invention is remarkably effective for a high-sensitivity analysis of the sample solution which is separated by the liquid chromatograph suited for analyzing the sample solution containing a high concentration of water.

Figure 7:
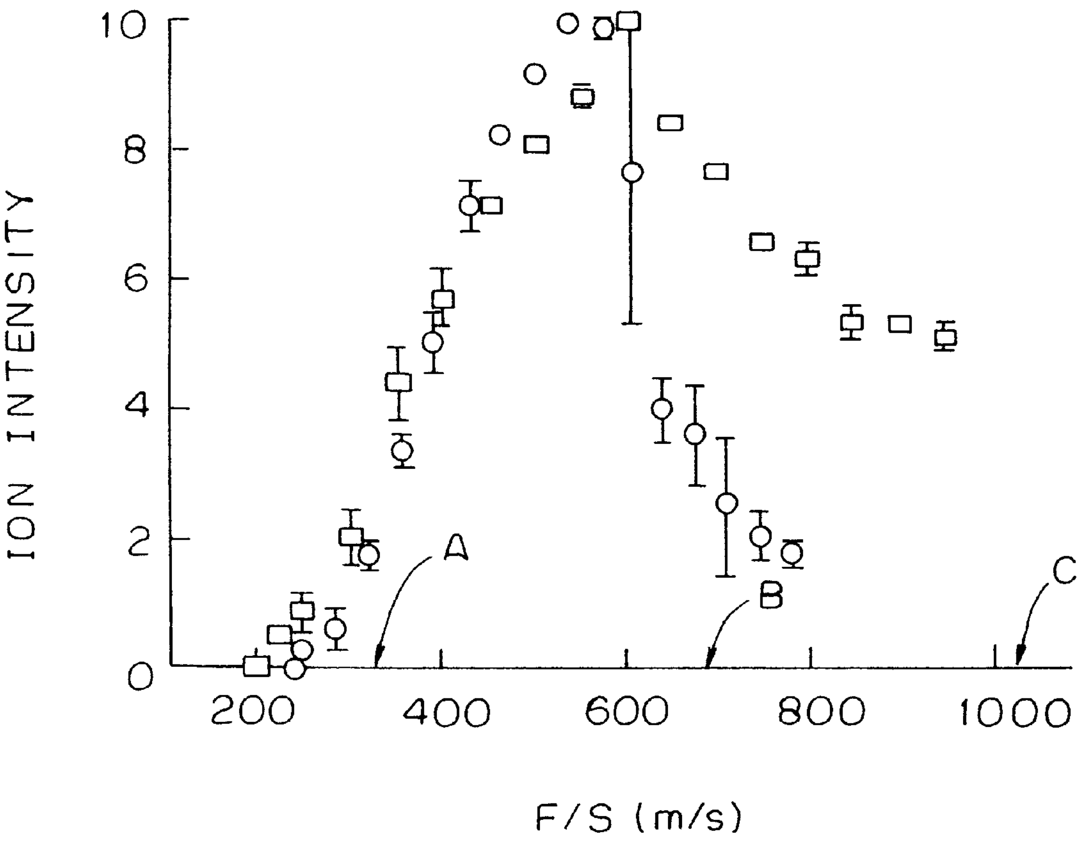

(5) Relation between Characteristic Value of Sprayed Gas and Ion Intensity, and Measurement of Mach Number (FIG. 7)

In FIG. 7, the Gramicidin-S was used as the sample, and the sample solution (having a sample concentration of 1 $\mu$M) of an aqueous solution having a methanol concentration of 50% was prepared as the solvent. Then, the sample solution was introduced at a flow rate of 30 $\mu$L (i.e., microliters)/min. into the capillary 5. The Gramicidin-S was detected as a doubly charged ion (m/z=571) having two protons added.

FIG. 7 plots the ion intensity of the doubly charged ions (m/z=571) of the aforementioned Gramicidin-S against the characteristic value F/S of the gas flow, the mass flow meter (5850E of Brooks) was used to measure the gas flow rate F in the standard state (20° C. and 1 atm) in an accuracy of 1%.

In FIG. 7, symbols ○ and □ indicate the relative intensities of ions, respectively, in case the $N_2$ gas and the Ar gas were used (the relative ion intensities were set to 10 in the individual cases). The abscissa of FIG. 6 indicates the gas velocity obtained from the characteristic value F/S.

The relative ion intensities, as observed in the cases of using the $N_2$ gas and the Ar gas, indicate substantially similar behaviors till the characteristic value F/S of about 550 m/s but different changes after the characteristic value F/S exceeds about 600 m/s. The changes in the relative ion intensities accompanying the changes in the characteristic value F/S are not reproduced. This is thought to result from the fact that in case the flow velocity of the sprayed gas is supersonic, shock waves and/or expansion waves may be produced in the vicinity of the capillary tip to make the ionization unstable, as will be described hereinafter.

Under the condition, as indicated by arrow C in FIG. 7, the gas flow through the ion source body has an upstream gas pressure of 7 atms. ($P_0$=7 atm). On the other hand, the pressure outside of the ion source is 1 atm (P=1 atm.). Therefore, the Mach number M can be determined by using the following relation for an equi-entropy flow:

$$P_0/P=\{1+0.5\ (\gamma-1)M^2\}^{**}\alpha \quad (3).$$

In Equation (3): $\alpha=\{\gamma/(\gamma-1)\}$; $^{}\alpha$ the power of $\alpha$; and $\gamma$ the specific heat ratio of 1.4 for the $N_2$ gas (Reference should be made to T. Ikui and K. Matsuo: Dynamics of Compressive Fluid (Rikogakusha), and H. W. Liepmann, A. Roshko: Elements of Gasdynamics (John Wiley & Sons. Inc. NY, 1960)). If the Mach number M is determined by using the relation of Equation (3), M=1.93 is estimated for the characteristic value F/S=1040 m/s. at the point C, as indicated by arrow in FIG. 7. Thus, it is concluded from the experimental results of FIG. 7** that the Mach number M is no more than 2.

Figure 8A:
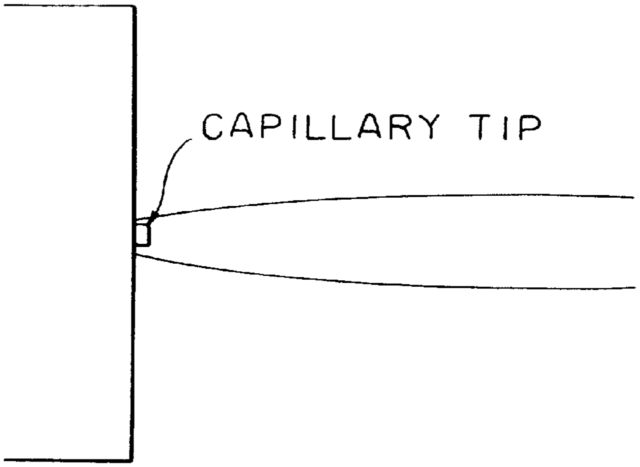
FIGS. 8A and 8B are diagrams schematically illustrating photographs of the sprayed gas taken with the schlieren method.
Figure 8B:
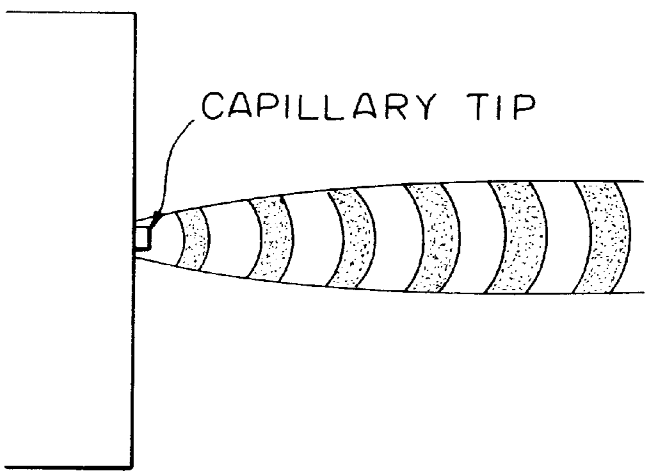

A compressive fluid such as gas has a change in refractive index due to the change in density. By making use of these characteristics, the flow can be visualized. By using the $N_2$ gas but not introducing the sample solution, therefore, photographs were taken with the schlieren method under the conditions of the characteristic values F/S=345, 691 and 1040 m/s, as indicated by arrows A, B and C in FIG. 7, to determine the Mach number M on the basis of Equation (3). The schlieren photographs of the sprayed gas obtained are schematically presented in FIGS. 8A and 8B. FIG. 8A is a schematic diagram presenting the schlieren photograph of the sprayed gas obtained for the characteristic value F/S=345 m/s, as indicated at point A in FIG. 7. The right-hand side of FIG. 8A schematically shows the state of gas flow at the tip of the ion source, and the capillary tip is exposed by about 0.3 mm from the ion source. The sprayed gas flows rightwards from around the capillary tip, as shown in FIG. 8A. This schlieren photograph presents only the outline of the gas flow. The schlieren photographs obtained for the characteristic values F/S=691 and 1040 m/s at the points B and C of FIG. 7 are schematically presented in FIG. 8B. Unlike FIG. 8A, clear stripes corresponding to the large density changes appear in the gas flow. These stripes are judged to be the expansion waves which are produced in the supersonic flow. It is concluded that a supersonic flow is established for the point B in the vicinity of the capillary tip so that the Mach number M exceeds 1. For the characteristic value F/S=345 m/s at point A, on the other hand, no stripe is formed so that the Mach number M is less than 1. This means that the condition for M=1 exists between the points A and B, as indicated by arrows in FIG. 7, that is, in the region including the characteristic value F/S for the maximum ion intensity.

In the supersonic case in which the velocity of the sprayed gas has a Mach number more than 1, as illustrated in FIG. 7, shock waves and/or expansion waves are established in the vicinity of the capillary tip so that the pressure fluctuates in the vicinity of the capillary tip. Thus, it seems that large liquid droplets are liable to form whereas small charged droplets necessary for forming the ions are reluctant to form, so that the ion intensity to be observed becomes low and unstable. In the supersonic region, moreover, the sprayed gas is seriously cooled by the adiabatic expansion (because the gas guide tube in the experiments of FIG. 7 is not heated for preventing the cooling) so that the atomization of the charged droplets is thought to be suppressed. Therefore, it is thought that the Mach number M=1 occurs between points A and B indicated by arrows in FIG. 7, that is, at the characteristic value F/S=about 550 m/s for maximizing the ion intensity. Because of the aforementioned instability, when the characteristic value F/S exceeds about 550 m/s, the dispersion in the measurement, as indicated by the lengths of the straight lines attached to the measurement points increases as in the case of measurement with the spray of the $N_2$ gas, as illustrated in FIG. 7.

The conditions for the measurement and instrumentation of the measurement results, as illustrated in FIG. 7, are absolutely identical to those of FIG. 6 excepting the kind of the gas and the measurement of the gas flow rate F. The ion intensity, as illustrated in FIG. 7, is not based upon the heating of the capillary and the ions which are produced by the voltage applied to the capillary, but the production of the ions observed is effected only by the operations of the sprayed gas. As in the result of FIG. 7, a more sufficient ion intensity than that of the method of the prior art is obtained, as will be described in the following, even if the capillary is not heated.

The ion intensity to be detected in the case of the ion-spray method for producing the ions through the electrospray phenomenon by setting the characteristic value F/S of the gas flow to such a value of 5 m/s as can neglect the ions produced by the spray of the gas, by applying a high voltage of about 3 kV between the capillary and the sampling orifice, and by the electrospray phenomenon, is no more than about one tenth of the maximum of the ion intensity, as illustrated in FIG. 7.

An ion intensity about three times as high as or higher than the ion intensity by the ion spray method of the prior art can be achieved by setting the characteristic value F/S of the sprayed gas within a range of 350 to 700 m/s. It is preferable to set the characteristic value F/S of the sprayed gas within a range of 400 to 800 m/s, and then it is possible to achieve an ion intensity six times as high as or higher than the ion intensity by the ion spray method of the prior art. If, moreover, the characteristic value F/S of the sprayed gas is set within a range of 500 to 600, an ion intensity ten times as high as or higher than that of the ion spray method of the prior art can be achieved with the most preferable result.

Figure 9:
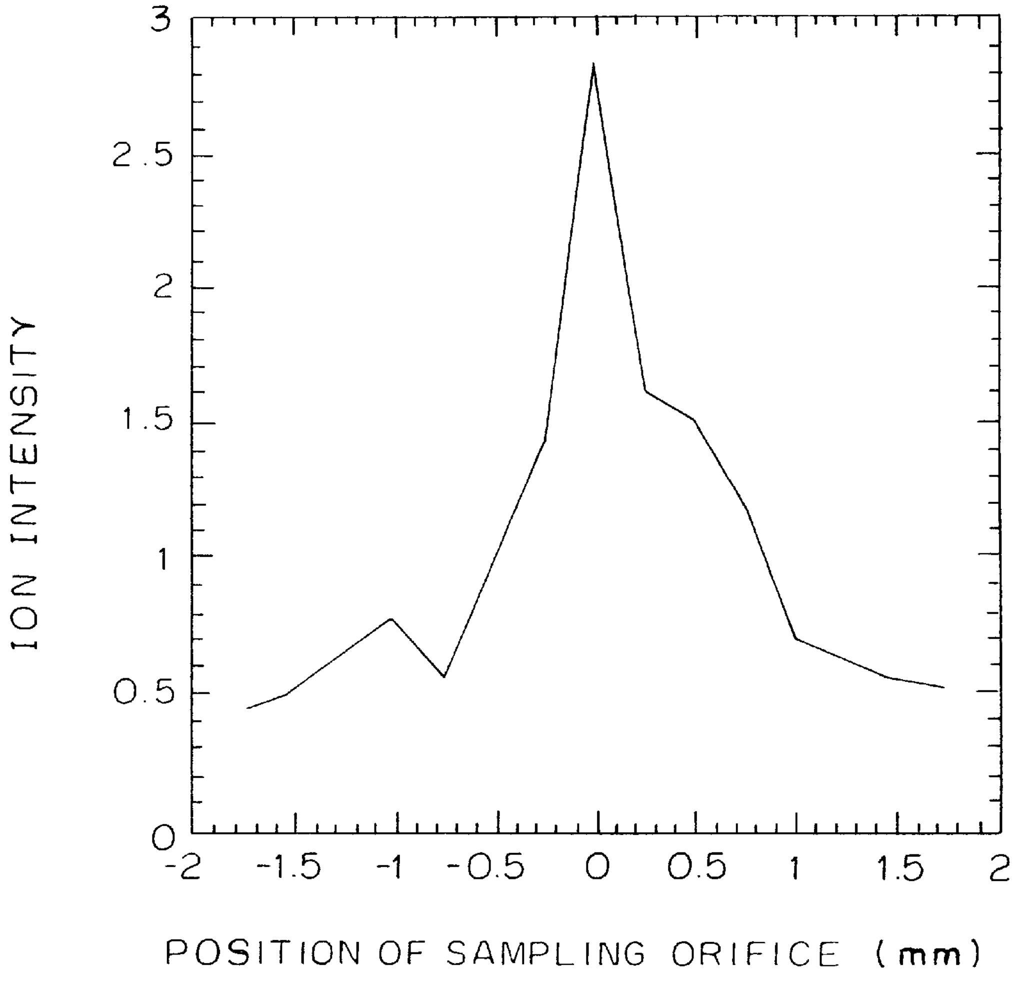
FIG. 9 is a diagram illustrating a relation between a positional displacement between a capillary tip position and a position of the sampling orifice, and the ion intensity.

(6) Relation (FIG. 9) between Displacement of Sampling Orifice Position from Tip Position of Capillary and Ion Intensity The distance between the capillary 5 and the sampling orifice 17 was held at 5 mm. The opening of the orifice, the capillary 5 and the sampling orifice 17 of the ion source were so aligned as to maximize the detected ion intensity (as this set position will be used as a reference position (=0) of the later movement), as has been described in connection with the fourth embodiment. Then, the ion intensity from the sample solution was measured. Next, the ion source was horizontally moved as a whole, and the ion intensities of the doubly charged ions of the Gramicidin-S (that is, the sample solution was the Gramicidin-S solution (having a concentration of 10 $\mu$M) in the solvent of the aqueous solution of 50% of methanol) were detected at the individual positions of movement, as plotted in FIG. 9. The sharp peak corresponding to the relative ion intensity of about 2.8, as located at the central portion of FIG. 9, disappears as the characteristic value F/S (=550 m/s) for the gas flow corresponding to the sharp peak is enlarged. Then, the relative ion intensity changes into a widened blunt peak having a relative ion intensity of about 1.6. In the vicinity of the ion source moving distances of −1 mm and 0.5 mm, there are small peaks, which are thought to come from the disturbances of the sprayed gas flow distorted from the hole (having a diameter of 2 mm) of the cover 19 in front of the sampling orifice 17. The result, as illustrated in FIG. 9, remains unchanged even if the position of the entire ion source is vertically moved.

The aforementioned moving distance, i.e., the position of 1 mm is located on the circumference of the base of a right circular cone which has its vertex at the center of the tip of the capillary 5 and on the center axis of the capillary and which has a vertical angle of about 22.5 degrees. In short, the sampling orifice 17 has its center position (of 1 mm) located in that circumference. Likewise, the moving distance, i.e., the position of 0.2 mm is located on the circumference of the base of a right circular cone which has its vertex at the center of the tip of the capillary 5 and on the center axis of the capillary and which has a vertical angle of about 4.5 degrees. In short, the sampling orifice 17 has its center position (of 0.2 mm) located in that circumference. Preferably, by arranging the center position of the sampling orifice in the circumference of the base of the right circular cone having the aforementioned vertical angle of 22.5 degrees, the ion intensity obtained is about 2.5 times as high as or higher than that obtained by the ion spray method of the prior art. More preferably, by arranging the center position of the sampling orifice in the circumference of the base of the right circular cone having the aforementioned vertical angle of 4.5 degrees, the ion intensity obtained is about 6 times as high as or higher than that obtained by the ion spray method of the prior art.

Even in the supersonic case, moreover, in which the characteristic value F/S of the sprayed gas is increased more than 550 m/s, the ion intensity obtained is about 6 times as high as or higher than that obtained by the ion spray method of the prior art.

Figure 10:
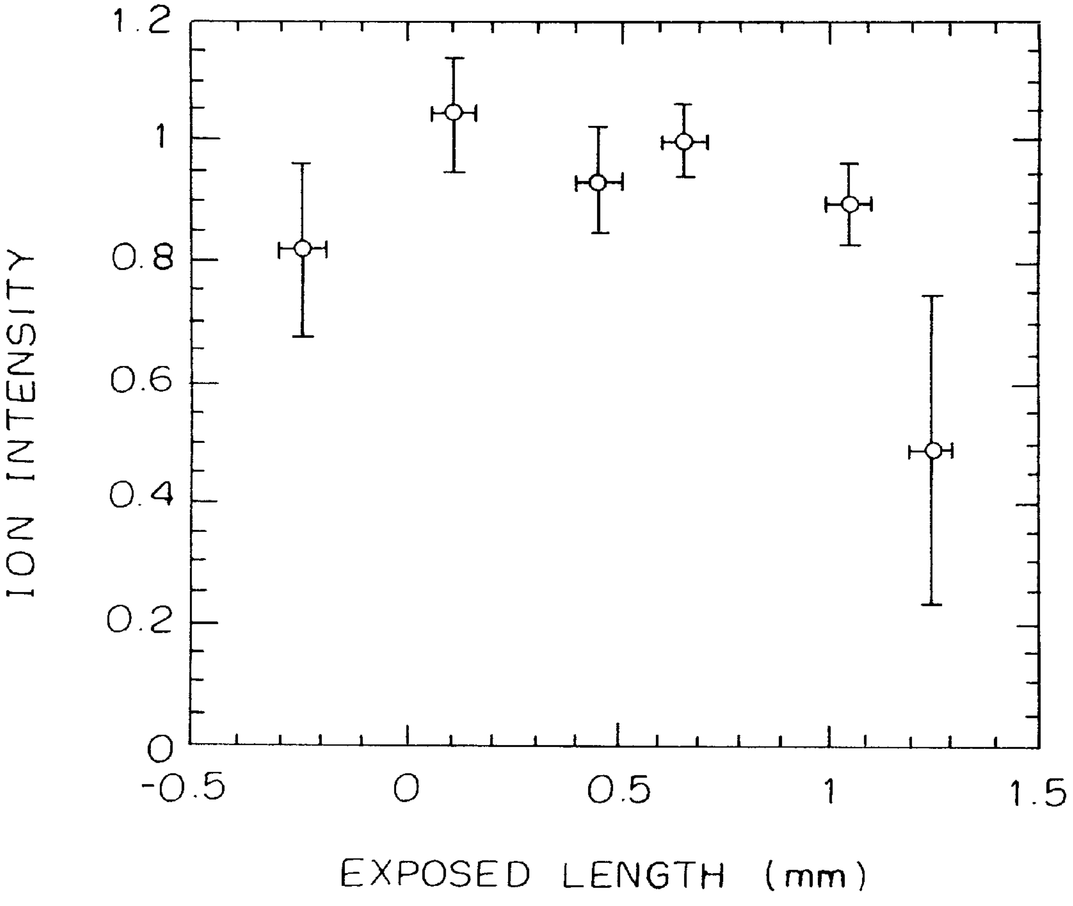
FIG. 10 is a diagram illustrating a relation between the exposed length of the tip position of the capillary and the ion intensity.

(7) Relation (FIG. 10) between Exposed Length of Capillary Tip from Tip of Gas Guide Tube and Ion Intensity FIG. 10 plots the ion intensity which was detected when the exposed length (i.e., L in FIGS. 2 and 3) of the tip of the capillary 5 exposed from the atmospheric face of the opening having the minimum internal diameter at the tip of the orifice 7 was changed. For the exposed length L more than 1.2 mm, the ion intensity drops. As the exposed length L increases, the gas velocity at the tip of the capillary is substantially decelerated so that the ion intensity detected accordingly decreases. This makes it preferable that the aforementioned exposed length L be set within a range of −0.25 to 1.0 mm.

Figure 11:
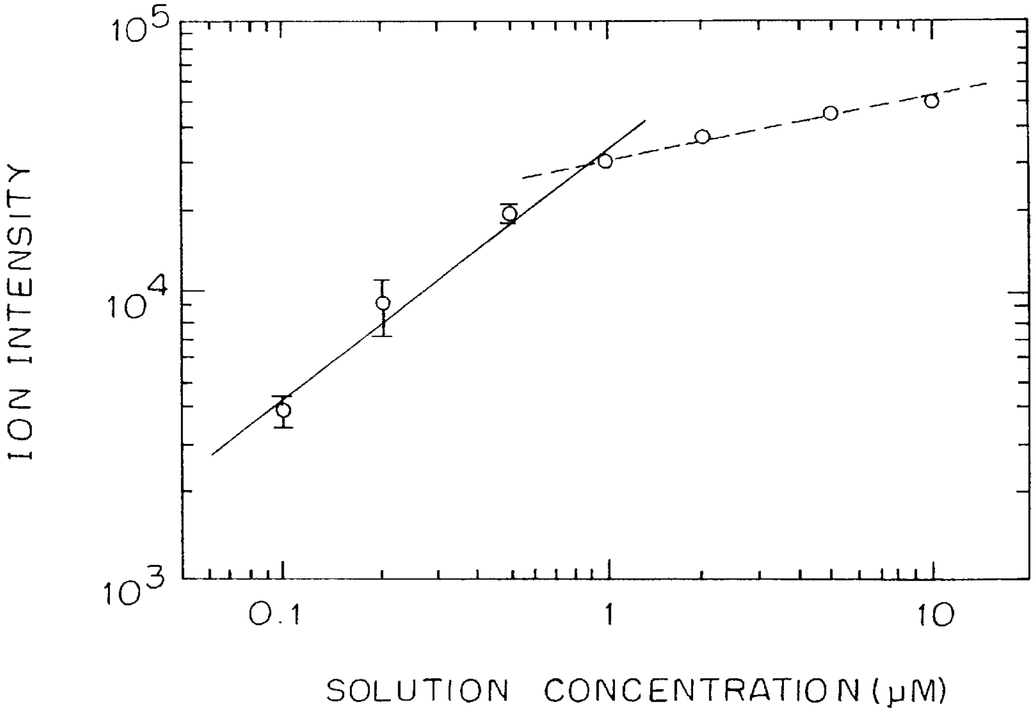
FIG. 11 is a diagram illustrating a relation between a sample solution concentration of the ion intensity.

(8) Relation (FIG. 11) between Sample Solution Concentration and Ion Intensity FIG. 11 plots the ion intensity which was detected when the concentration of the Gramicidin-S is changed. In a low concentration region less than about 1 $\mu$M, the ion intensity linearly changes to increase against the sample concentration. The ionization method of the present invention is preferable especially for a sample solution concentration of about 1 $\mu$M or less. For a sample concentration of about 2 $\mu$m or more, the ion intensity detected exhibits a linear change different from that in the lower concentration region of about 1 $\mu$M or less. The reason why the increase in the ion intensity is not changed so much in the higher concentration range of about 2 $\mu$M or more even if the sample concentration is changed is thought to come from the fact that the solution has a pH of about 5 so that most of the protons in the sample solution are bonded to the Gramicidin-S molecule and exhausted in the higher concentration region.

Figure 12:
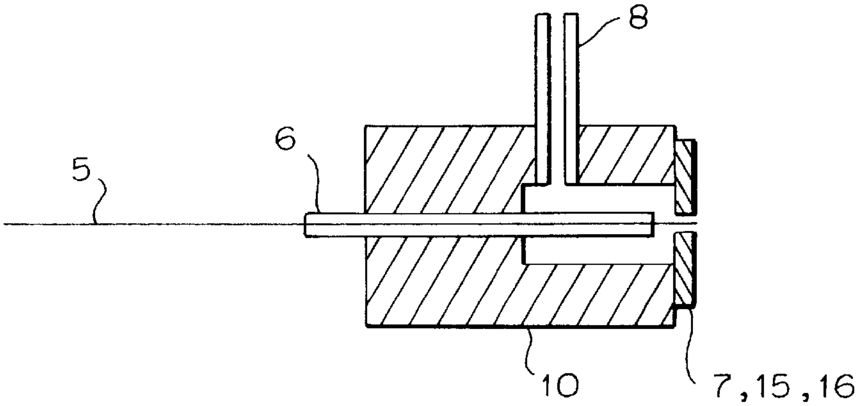
FIG. 12 is a section for explaining a simple method of fabricating an ion source body.

The fifth embodiment of the present invention provides a simple method of fabricating the gas guide tube as shown in FIG. 12. FIG. 12 is a section showing a modification of the orifice holder shown in FIG. 3.

The details of the individual portions 7, 15 and 16 shown in FIG. 12 are identical to those of FIG. 3 so that they are omitted from FIG. 12. As is apparent from the section of FIG. 12, the orifice holder can be prepared by a simple method of merely boring a circular cylinder.

Incidentally, the individual portions composing the ion source gas guide tube may be made of materials different from those described in the foregoing individual embodiments, such as various metallic materials, glass, ceramics or filler filled high polymer resins.

While the present invention has been described in detail and pictorially in the accompanying drawings it is not limited to such details since many changes and modifications recognizable to those of ordinary skill in the art may be made to the invention without departing from the spirit and the scope thereof.

What is claimed is:

1. An ion source comprising:

a body having a gas passage defined therein, a gas inlet connected to the gas passage, and an orifice defined in the body and connected to the gas passage;

a capillary through which a sample solution flows towards a tip of the capillary, at least a portion of the capillary being inserted into the body so that at least a portion of the capillary is surrounded by at least a portion of the gas passage, and so that a tip portion of the capillary including the tip of the capillary extends at least partially into the orifice;

a gas supplier, connected to the gas inlet, which supplies a gas through the gas inlet into the gas passage to form a gas flow through the gas passage along the capillary and through the orifice past the tip of the capillary so that the gas flow sprays the sample solution from the tip of the capillary, and which regulates a pressure of the gas in the gas passage to adjust a characteristic value F/S to a predetermined value, where F is a flow rate of the gas flow at standard conditions (20° C., 1 atmosphere), and S is a difference between a cross section of the orifice and a cross section of the tip portion of the capillary in the orifice; and adjusting means for adjusting an exposed length of the capillary, the exposed length of the capillary being a distance between the tip of the capillary and an external surface of the body at the orifice.

2. An ion source according to claim 1, wherein the adjusting means adjusts the exposed length of the capillary to be between −0.25 mm and 1.2 mm.

3. A mass spectrometer comprising:

a body having a gas passage defined therein, a gas inlet connected to the gas passage, and an orifice defined in the body and connected to the gas passage;

a capillary through which a sample solution flows towards a tip of the capillary, at least a portion of the capillary being inserted into the body so that at least a portion of the capillary is surrounded by at least a portion of the gas passage, and so that a tip portion of the capillary including the tip of the capillary extends at least partially into the orifice;

a gas supplier, connected to the gas inlet, which supplies a gas through the gas inlet into the gas passage to form a gas flow through the gas passage along the capillary and through the orifice past the tip of the capillary so that the gas flow sprays the sample solution from the tip of the capillary, and which regulates a pressure of the gas in the gas passage to adjust a characteristic value F/S to a predetermined value, where F is a flow rate of the gas flow at standard conditions (20° C., 1 atmosphere), and S is a difference between a cross section of the orifice and a cross section of the tip portion of the capillary in the orifice;

a sample solution supplier, connected to the capillary, which supplies the sample solution to the capillary;

an analyzer, disposed downstream from the orifice in a direction of the gas flow through the orifice, which receives gaseous ions formed from the sample solution sprayed by the gas flow from the tip of the capillary, and which analyzes a mass of the gaseous ions; and adjusting means for adjusting an exposed length of the capillary, the exposed length of the capillary being a distance between the tip of the capillary and an external surface of the body at the orifice.

4. A mass spectrometer according to claim 3, wherein the adjusting means adjusts the exposed length of the capillary to be between −0.25 mm and 1.2 mm.

* * * * *